April 30, 1946.　　　C. M. BOLSTER　　　2,399,196
TOWED GLIDER LAUNCHING
Filed April 30, 1942　　　5 Sheets-Sheet 1
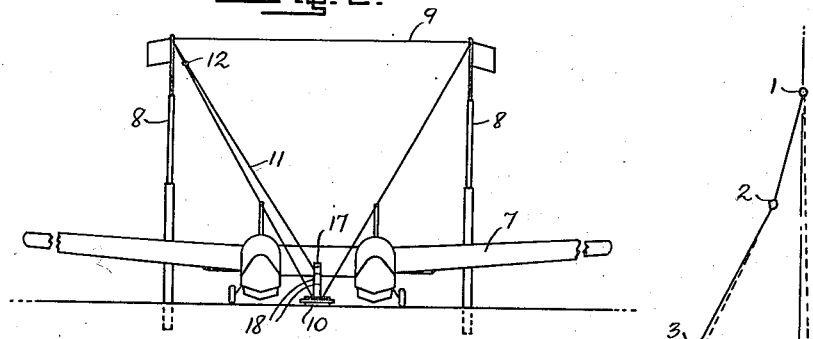
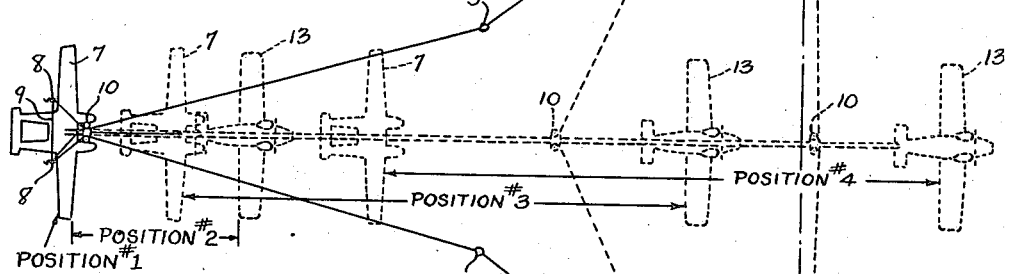
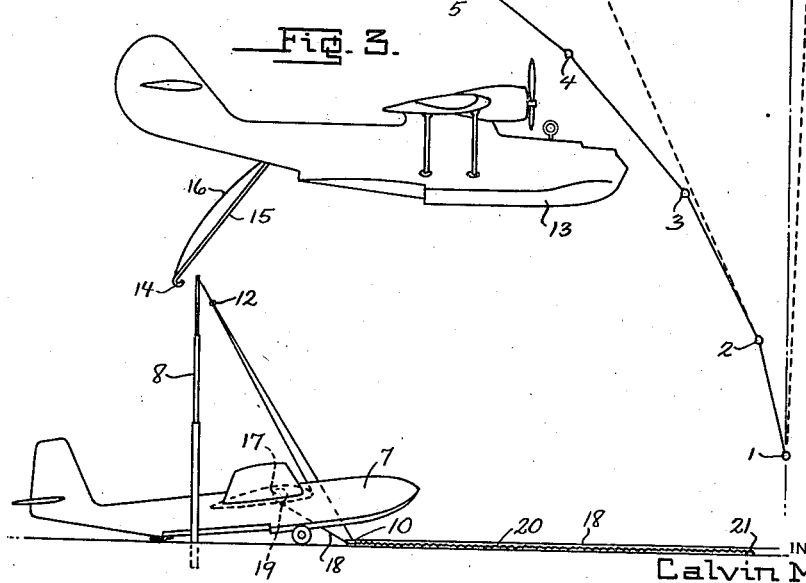
INVENTOR
Calvin M. Bolster
BY
ATTORNEY

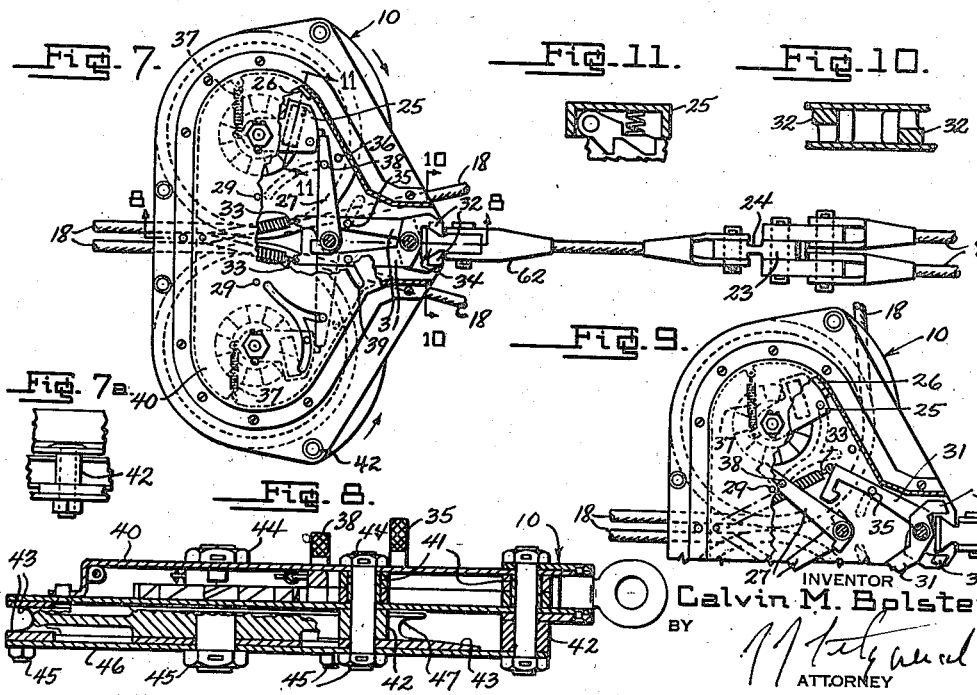

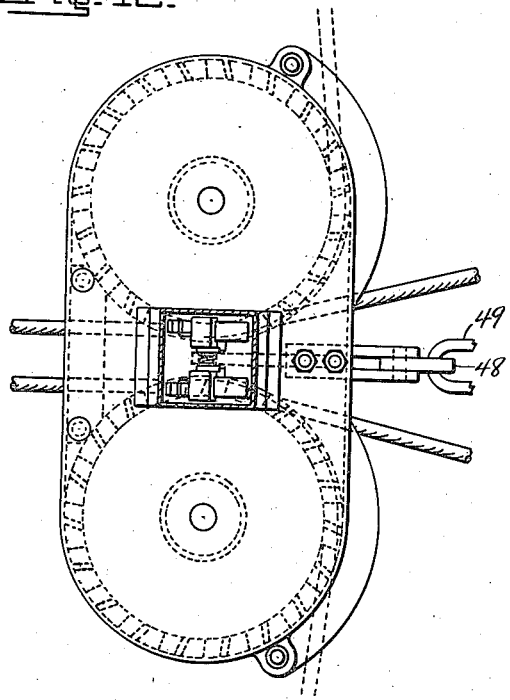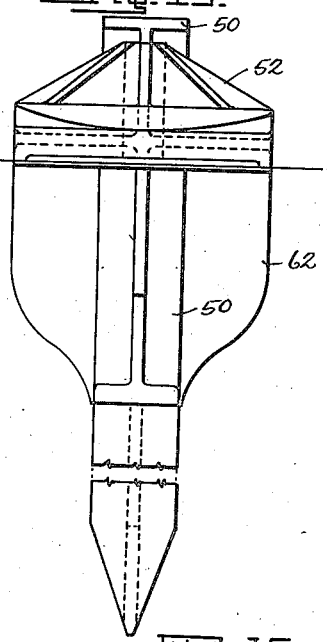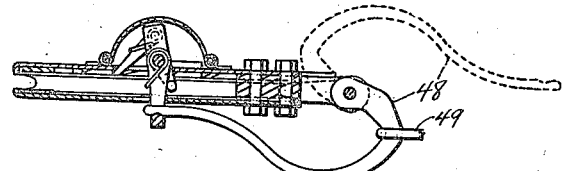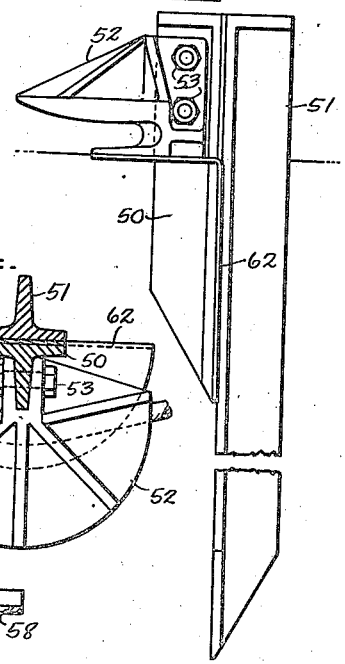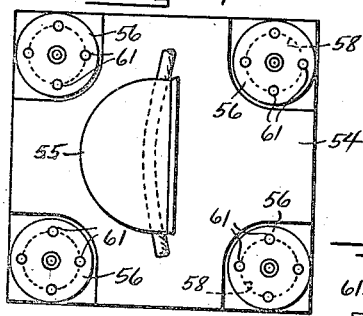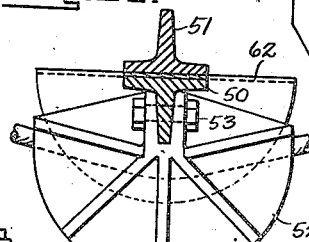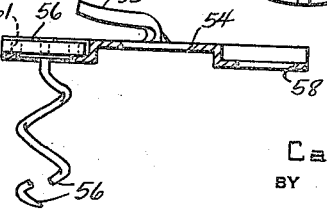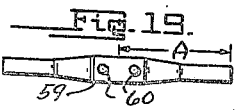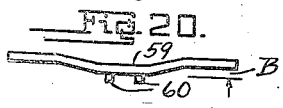
INVENTOR
Calvin M. Bolster April 30, 1946.  C. M. BOLSTER  2,399,196
TOWED GLIDER LAUNCHING
Filed April 30, 1942  5 Sheets-Sheet 4
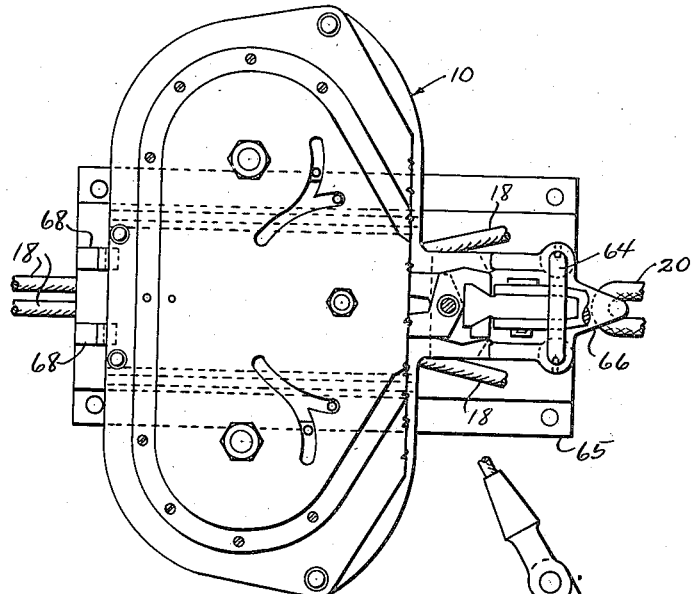
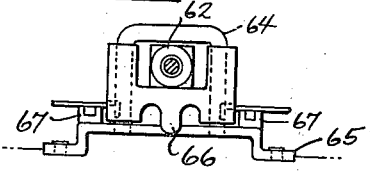
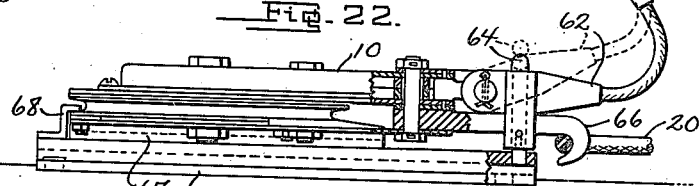
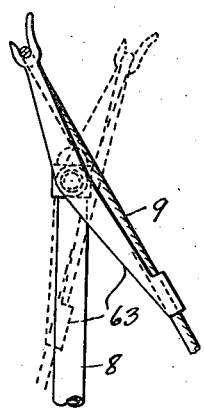
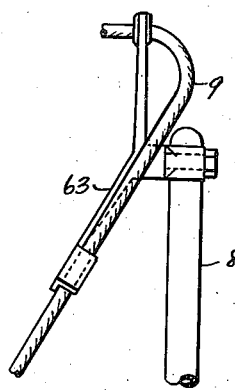
INVENTOR
Calvin M. Bolster
BY
ATTORNEY Patented Apr. 30, 1946

2,399,196

UNITED STATES PATENT OFFICE 2,399,196

TOWED GLIDER LAUNCHING

Calvin M. Bolster, United States Navy

Application April 30, 1942, Serial No. 441,187

19 Claims. (Cl. 244—63)

(Granted under the act of March 3, 1883, as amended April 30, 1928; 370 O. G. 757)

The present invention deals with methods and apparatus for launching gliders with the aid of a tow plane in flight.

The object is to make glider launching by means of tow planes simpler, easier and safer than it has been heretofore.

More specifically, one of the objects is to provide means and methods for launching a glider by the use of a tow plane travelling over the glider to be launched, and picking up a bridle suspended between a pair of poles. The bridle is connected to a dual-sheave trolley mounted to overhaul a doubled launching cable the loop end of which is passed through the trolley between the sheaves and is hooked to the glider, the loose ends being stretched outwardly and forwardly along the ground to a pair of king posts fixed at some distance from the glider. As the bridle is picked up by the tow plane, it draws the trolley forward at tow plane speed, while the glider is given a gradually increasing acceleration until it reaches tow plane speed at which time the trolley is automatically released from the bridle, while towing is taken over by a light tow line originally attached to the bridle and paid out from a small reel in the glider as long as the distance between the glider and plane increased.

Another object is to construct suitable automatic trolley release means and provide precautionary safety measures to ensure the release of the trolley from the bridle after the glider has reached tow plane speed.

Another object is to run the cables passing through thet rolley around posts in the ground located so as to modify the shape of the cables between their fixed ends and the trolley, in a manner to obtain a more uniform acceleration for the glider.

Another object is to anchor the trolley at its starting position, connecting a bungee to it to give it its initial forward motion when released, and providing means for releasing the trolley when the tow plane picks up the bridle. This device is used where it is necessary to reduce the initial shock of starting the trolley and glider in motion.

The above and other objects will appear more fully from the following description when considered in connection with the drawings, in which:

Fig. 1 shows the general ground layout of one preferred form of the arrangement wherein five pairs of ground posts are used and illustrates the four progressive positions of the apparatus during the launching operation.

Fig. 2 shows a glider in its initial set-up preparatory to launching, drawn on a somewhat larger scale than Fig. 1.

Fig. 3 is a side view illustrating the relation of tow plane and glider at the moment when the former is about to pick up the bridle.

Figs. 4, 5 and 6 show the relation of parts in progressive stages during the launching operation.

Figs. 7 and 8 are plan and side views respectively, partly in section, of the trolley unit, with a special quick release device and a safety link connected thereto.

Fig. 7a is a detail of a portion of Fig. 7.

Fig. 9 shows the relation of parts of the trolley when the locking means are released.

Figs. 10 and 11 are sections thereof taken at the positions indicated by the corresponding section lines in Fig. 7.

Figs. 12 and 13 illustrate a pelican hook quick release, that may be used in place of the jaw and release device shown in Figs. 7 and 8.

Figs. 14 to 16 show details of one form of the ground posts,

Figs. 17 and 18 show diagrammatically a form of anchor plates which may be used for the same purpose as the ground posts, Figs. 19 and 20 are top and side views of a wrench adapted for installing the anchor plates.

Figs. 21 to 25 illustrate the trolley trigger arrangement for releasing the trolley upon initial contact of the tow plane grapple hook with the bridle.

Figure 26:
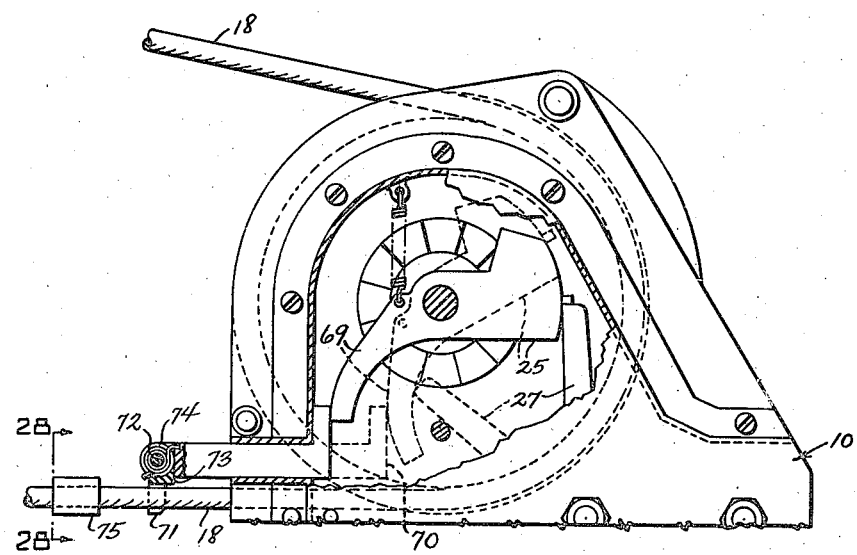
Figs. 26 to 28 show the positive safety override release for the trolley.

The problem involved in the present invention is to be able to pick up a glider and tow it easily out of a field of limited dimensions, and to facilitate the launching of gliders from any field, regardless of its size, by eliminating the necessity of carrying heavy launching and towing equipment in the air or of providing a large bulk of launching apparatus on the ground.

The common way of launching gliders, using a powered plane, has been to tow the glider from the start on the ground. This requires a long runway, careful handling and a strong tow-line to withstand the comparatively large towing forces encountered while the glider is drawn over the ground.

More recent methods include picking up the glider "on the fly," but require an unusually long and heavy tow line a large part of which is wound on a large reel mounted in the glider, and a heavy brake system on the reel to gradually apply the towing force to the glider through the towline, the free end of which is picked up at a distance from the glider by the tow plane.

The present methods require very little equipment, which is simple in nature and very easily set up. Furthermore no equipment has to be carried in flight except a light comparatively short tow line and simple attachments. Any plane equipped with a simple pick-up hook line may be used in these methods.

In general, the glider to be launched is prepared by setting it out in the field at some distance to the rear and at equal distances from two spaced king posts. A launching cable fastened at its ends to these posts is hooked at its center to the glider, and the glider is drawn back to take up the slack in the cable. A double-sheave trolley, made for the purpose, is slipped over the hooked loop of the cable by passing the loop between the wheels, prior to hooking the cable to the glider. A looped bridle is attached to the trolley and its loop is hung over the glider so that it may be picked up by a grapple hook suspended from the tow plane. When the bridle is picked up, it immediately draws the trolley forward at tow plane speed but the glider gains speed gradually with an acceleration which depends on the characteristics of the layout of the cable and the ground posts, until the trolley reaches a point in line with the fastened ends of the cable. At this time obviously the glider has attained tow plane speed, because the trolley has ceased to travel over the cables. Automatic release means are provided to release the trolley from the bridle at this point, and the towing is taken over by a light tow line which had previously been attached to the bridle and had paid out from the glider during its accelerating period. The trolley being free, the cable becomes loose and drops off the hook on the glider, and both fall to the ground. The bridle may also be dropped from the tow plane, after the end of the light tow line has been retrieved by it and fastened in the plane.

If desirable for any purpose, the release of the trolley could be delayed until the glider attained a greater speed; but the trolley would have to be released before the launching cable all paid out on its return journey through the trolley.

In the preferred method, where the purpose is to bring the glider merely up to the tow plane speed, the trolley is released when it reaches a point in a direct line with the ground posts to which the cable is fastened.

In a more specific form of the method to be hereinafter disclosed, the acceleration characteristics of the ground lay-out may be modified to suit requirements. It may be shown that the acceleration of the glider effected by the present general method is variable and is a function of the angle between the two cables and of the distance of the glider from the point midway between the ground posts to which the cable ends lead. By placing pairs of ground posts within the angle which the trolley makes with the king posts and passing the line around the front of these ground posts, the change in the angle may be modified with relation to the change in the distance above referred to, so as to modify the acceleration characteristics within definite limits. By a proper selection of the number and location of these additional posts, an acceptable pattern may be designed with a reasonably small number of posts and comparatively small over-all space requirements, which will give the glider a substantially constant acceleration of 1.5 times gravity, with a tow plane speed at about 90. M. P. H.

One specific form of apparatus which will carry out my method is illustarted in the drawings. The ground lay-out in Fig. 1 shows four pairs of ground posts 2 to 5 inclusive in addition to the king posts 1 to which the ends of the launching cable 18 are fastened. As may be seen, the points about which the two cables swing, change progressively from one pair of posts to the next, beginning with 5, as the trolley proceeds on its journey. Four progressive steps in the launching are indicated in Fig. 1, showing the corresponding relative positions of the plane, glider and launching cable at each step.

In Fig. 2 the glider 7 is shown in starting position prepared for launching. The poles 8 are set up behind the glider. The bridle 9 is hung over the poles and fastened to the trolley 10. The light tow line 11 is attached to the bridle at 12. The side view of the glider in this position may be seen in Fig. 3, which also shows the tow plane 13 flying overhead at the instant when its hook 14 is about to pick up the bridle. The hook in this case is mounted on a rigid arm 15 pivoted in the fuselage of the plane to prevent fluttering of the hook under turbulent air conditions. 16 is a pick up line to draw the bridle into the plane at the proper time. 17 is the tow line reel in the glider and 18 is the launching cable passed over a downwardly directed hook on the glider at 19. In the form of apparatus illustrated here, the trolley is held in an anchor 22 on the ground by means of a trip release device which is tripped automatically at the instant the bridle is picked up to release the trolley from the anchor. The trolley besides being connected to the bridle is also hooked on to one end of the bungee 20 stretched out in front of it and anchored to the ground at its other end at 21. When the trolley release device is tripped, the bungee initiates the forward movement of the trolley so as to reduce the shock of its sudden acceleration to tow plane speed when the slack in the bridle is taken up. This may not be necessary in cases where this shock is not excessive.

In Figs. 4 to 6 may be seen the relative position of the parts of the apparatus in side view in three consecutive steps indicated in plan view in Fig. 1.

A preferred form of trolley and its connections to the bridle are shown in detail in Figs. 7 to 11. In this form, a safety link 23 including a breakable bar portion 24 is inserted in the connection between the trolley and the bridle. If the release mechanism should fail to function, this bar gives way before the subsequent overtaking of the plane by the glider, due to the fact that this bar portion is designed to withstand a maximum stress between normal towing force and twice that amount. Normally, upon the slightest reversal of movement of the cables in the reverse direction through the trolley unit, as would occur in launching as soon as the trolley passed the position in a direct line with the king posts, the pawls 25 swing outward against their stops 26 as shown in Fig. 9, thus releasing the lock arms 27 so that they may be swung backward around their common pivot 29, in response to separation of the jaw arms 31. As a result of the pull on the coupling member 34 the jaws 32 then open against the tension springs 33 which normally move them to closed position, and the trolley and cables fall away to the ground.

In order to make the coupling, in preparation for the next launching, all that is necessary to do is to insert the coupling member in the jaws while swinging them open manually by means of the studs 35 extending through accurate slots 39 in the cover 40. Upon releasing them they will automatically close due to the tension of springs 33. The jaw arms are then locked by manually swinging the lock arms outward against their stops 36 with the aid of the studs 38. In doing this the pawl units 25 will be swung under the ends of the lock arms because of the tension of springs 37 and will thus set the lock ready for operation as described above. 41 and 42 are spacers and 43 are rubbing strips to prevent the cables from fouling. Nuts 44 are for the removal of the top cover 40 for access and removal of the ratchet pawls and levers, while the nuts 45 on the bottom are for removal of bottom plate 46 for access to and removal of the sheaves or wheels 47.

Figs. 12 and 13 illustrate another form of trolley having a pelican hook coupling with a quick release upon reversal of the movement of the cables. The resulting reverse rotation of the sheaves trip the pawl and ratchet locking means to release the pelican hook 48 which automatically unhooks the link 49 connected to the bridle.

One form of ground posts to be used for deflecting the launching cables between the trolley and the king posts to modify the acceleration characteristics is shown in detail in Figs. 14 to 16. Another form of device which may be used for the same purpose is disclosed in Figs. 17 and 18. In the first form, the main parts of the unit are the two T sectioned stake portions 50 and 51 driven into the ground back to back, the shorter portion being backed up by the longer one. The cable receiving portion 52 is bolted to the top of the web of the short stake as shown, at 53, on a level with the ground. A lining 62 may be used under the piece 52 and between the stake portions as shown.

The plate form shown in Figs. 17 and 18 is installed by the aid of a wrench shown in Figs. 19 and 20. The plate 54 with the cable receiving portion 55 welded thereon is placed in the desired location and the flat headed screws 56 are driven through the openings 58 in the corners of the plate into the ground by means of the wrench tool 59 and its studs 60 which fit into the bores 61 in the screw heads. The wrench is offset a suitable amount B for hand clearance and its arms may be of any convenient length A.

The details of the trolley anchor and release means may be seen in Figs. 21 to 23. The bridle which is attached to the trolley by the link means 62 as shown, is hung over a pair of rockable levers 63 pivoted at the top of the poles 8, formed so as to draw the link means up upon swinging in response to the initial contact of the bridle with the pick up hook. The upward motion of the link 62 trips the lock means 64 and releases the trolley from its anchor 65. The bungee 20 being stretched forward and hooked to the trolley at 66, starts the trolley on its way, to reduce the shock of its being picked up by the fast moving plane when the bridle is fully stretched out forward thereby. Hook 66 is made so the bungee will readily drop off after having performed its duty. The anchor plate 65 has guide rails 67 on which the trolley sets when placed in starting position with its rear edge under the clips 68.

Figure 27:
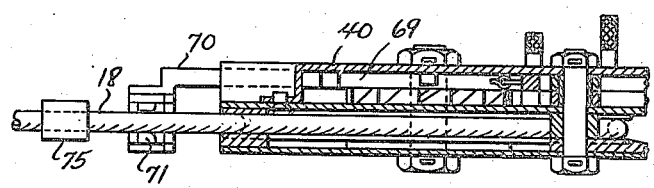
Figure 28:
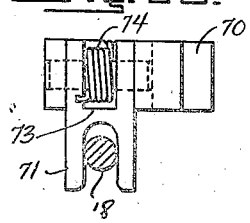

A positive trolley release device such as shown in Figs. 26 to 28 may be provided to ensure its release as a safety precaution in case the other release devices should fail to work. The pawl units 25 in this device are extended to form arms 69 which may be positively kicked to the release position by striker members 70 slidably mounted in the cover 40 and having yokes 71 at their other ends straddling the cables 18. On the cables near their glider ends are large swaged fittings 75 which will not pass through the yokes. These fittings are small enough to pass through the trolley and when travelling therethrough in the normal operating direction they will merely push the yokes out of their way when coming out of the trolley, the yokes being pivotally mounted on the striker members as shown at 72. But when travelling in the reverse direction these fittings will positively operate the strikers because the yokes are stopped against swinging in that direction by the shoulder 73. The spring 74 returns them to operating position if they should be swung in the other direction during normal operation.

To obtain a constant acceleration of the glider from a substantially constant speed of the plane, in the method of launching herein disclosed, it may be shown analytically that for any predetermined operating speed of the plane the launching cables would have to be deflected by a curved convex surface inwardly and forwardly, having a particular curvature depending on the distance between the starting point of the glider and the king posts and the distance between the king posts. This curvature may be reasonably approached by the use of only a few pairs of posts such as the ground posts herein described in place of the curved surface by placing them in selected positions, chosen so as to maintain the rate of acceleration between certain narrow limits.

In practice of course the plane speed would decrease a certain amount if the transfer of energy from the plane to the glider were not compensated for by increasing the power supplied to the plane by its propellers. This reduction however will either be negligible if the comparative weight and drag characteristics of the glider are negligible taking into account the acceleration characteristics of the apparatus used, or it may be satisfactorily compensated for, if there is a reserve of power available, by adjusting the power controls to meet the requirements of additional energy transferred to the glider to overcome its inertia during the acceleration and its increasing drag as its speed is built up.

From the foregoing description and the disclosure in the drawings which are merely illustrative, it is evident that various modifications and changes in the design of the apparatus and methods may be resorted to without departing from the spirit of the basic invention or the scope of the appended claims:

The invention described herein, if patented, may be manufactured and used by or for the Government for governmental purposes without the payment to me of any royalty thereon.

I claim:

1. In a launching apparatus for a glider to be towed by a plane in flight, a launching hook on the glider, two king posts fixed in the ground at substantially equal distances in front and to each side of the glider, a dual-sheave trolley, a cable stretched between said posts and extending to the glider, said cable being doubled at this point, the resulting loop passed between the sheaves of said dual-sheave trolley and attached to said launching hook on the glider, a pole set up on each side of the glider, a bridle attached to the trolley and hung over the top of the poles, means for automatically releasing the trolley and cable from said bridle and glider respectively when said trolley is drawn forward beyond a position in line with the king posts.

2. In a launching apparatus for a glider, a dual-sheave trolley, a launching cable laid out on the ground in the form of a V having its ends fixed and its vertex passed between the sheaves of the trolley and fastened to the front of the glider, a plane flown over the glider at a steady speed, means for picking up the trolley by the plane as it passes over the glider, and means for automatically releasing the trolley from the plane and the cable from the glider after the glider has reached the plane's speed.

3. Apparatus for launching a glider by means of tow planes in flight comprising: a launching hook under the glider nose, a dual-sheave trolley, a launching cable stretched out in a V shape having its ends fixed to the ground and its vertex passed through the trolley and hooked to the launching hook, a bridle attached to the trolley and having a loop, a pair of poles at the sides of the glider over which the loop of the bridle is stretched, means on the tow plane for picking up the bridle by its loop as the plane flies in a steady level course over the glider, means for releasing the trolley from the bridle in response to the rotation of the sheaves in reverse direction after the trolley has passed the vertical plane through the points where the cable is fixed to the ground, the cable being then free to drop off the glider hook.

4. Means for launching towed gliders including towing means, a cable system for imparting a gradually increasing speed to the glider from a substantially constant speed of the towing means, means for releasing the cable system from the glider and towing means after the glider reaches the speed of the towing means.

5. Apparatus for launching towed gliders including a tow plane, a cable system attached to the glider on the ground and havnig a gradually decreasing mechanical advantage when in use, means on the plane for hooking on to this system while flying over it to put it in operation, means for releasing said cable system from the plane and glider when the latter attains the speed of the former.

6. Apparatus as brought out in claim 5 in which a light weight tow line is mounted on a reel in the glider, means for picking up one end of this tow line by the plane when it hooks on to the cable system, means for fastening the tow line in the plane and glider to continue the towing after the cable system is released.

7. In an apparatus for launching towed gliders, a trolley having two sheaves, a cage for mounting the sheaves tangentially adjacent to each other, means attached to said cage for connection to a bridle, means for locking this connection means, release means for said locking means responsive to rotation of the sheaves in one direction only.

8. A trolley including a sheave, a cage for said sheave, means for releasably connecting said cage to a line, locking means for said connecting means, and release means responsivce to one direction of rotation of the sheave to release the locking means thus causing the connection to break.

9. In a cable system for launching gliders and the like, a cable, a trolley including a sheave, a cage in which the sheave is mounted, a line for pulling the trolley over said cable means a releasable connection between the cage and the line, locking means for said connection, means responsive to a reversal of rotation of the sheave for releasing said locking means and allowing the connection to be broken by the applied force.

10. In a glider launching apparatus, a hook at the nose of the glider, a cable streached out in the form of a V on the ground and having its ends fixed, a trolley having a housing with openings at the front and rear, two sheaves mounted tangentially to each other in said housing so that their line of tangency passes through the openings, the vertex of the V-shaped cable being passed through these openings from front to rear of said housing between the sheaves and looped over the hook at the nose of the glider just back of the trolley, a connection releasably connected to the trolley housing, means mounted in the trolley housing for locking said connection and means for releasing said locking means responsive to movement of the cable forward through the trolley housing.

11. In a glider launching apparatus, a hook at the nose of the glider, a cable stretched out in the form of a V on the ground and having its ends fixed, a trolley having a housing with openings at the front and rear, two sheaves mounted tangentially to each other in said housing so that their line of tangency passes through the openings, the vertex of the V-shaped cable being passed through these openings from front to rear of said housing between the sheaves and looped over the hook at the nose of the glider just back of the trolley, anchor means on the ground for the trolley housing, a vertically operated key for locking said housing to the anchor when in its lower position, a hook under the front of said housing, a stretched out bungee having a loop at one end passed over said hook under said housing and being anchored to the ground in front of the glider, a connection releasably connected to the trolley housing, a link passed under said key pivotally fastened back of it to said connection so as to release the trolley from its anchor when the link is drawn upward and the key is pulled up, means mounted in the trolley housing for locking said bridle connection, and means for releasing said locking means responsive to movement of the cable forward through the trolley housing.

12. In a glider launching apparatus, a hook at the nose of the glider, a cable stretched out in the form of V on the ground and having its ends fixed, a trolley having a housing with openings at the front and rear, two sheaves mounted tangentially to each other in said housing so that their line of tangency passes through the openings, the vertex of the V-shaped cable being passed through these openings from front to rear of said housing between the sheaves and looped over the hook at the nose of the glider just back of the trolley, anchor means on the ground for the trolley housing, a vertically operated key for locking said housing to the anchor when in its lower position, a hook under the front of said housing, a stretched out bungee having a loop at one end passed over said hook under said housing and being anchored to the ground in front of the glider, a bridle, a connection releasably connected to the trolley housing, a link between said bridle and said connection, said link being passed under said key and pivotally fastened back of it to said connection so as to release the trolley from its anchor when the link is drawn upward by raising the bridle end thereof thus pulling up the key out of its lock position, means mounted in the trolley housing for locking said bridle connection, and means for releasing said locking means responsive to movement of the cable forward through the trolley housing.

13. In a glider launching apparatus, a launching cable stretched out in the form of a V fixed to the ground at its ends, a glider attached at the vertex, a double sheave trolley mounted over the two side portions of the cable at the vertex to draw the two sides of the V together by rolling the sheaves over the doubled cable beginning at the vertex, pairs of ground posts for deflecting the two sides of the V inwardly at intervals, symmetrically along lines forming angles at the posts, so as to approach a constant acceleration of the glider at any particular speed of rolling of the trolley over the doubled cable.

14. In a glider launching apparatus, a hook at the nose of the glider, a cable stretched out in the form of V on the ground and having its ends fixed, a trolley having a housing with openings at the front and rear, two sheaves mounted tangentially to each other in said housing so that their line of tangency passes through the openings, the vertex of the V-shaped cable being passed through these openings from front to rear of said housing between the sheaves and looped over the hook at the nose of the glider just back of the trolley, a connection releasably connected to the trolley housing, means mounted in the trolley housing for locking said connection, means for releasing said locking means responsive to movement of the cable forward through the trolley housing and, safety means for positively operating said release means including swaged portions on the cable small enough to pass through the trolley sheaves without binding, a bar slidably mounted in the rear portion of the trolley housing parallel to the cable and having a forked member pivotally mounted thereon and resiliently held against a shoulder on the bar in such a position as to straddle the cable, and so that it will be pushed out of the way by the swaged portions against the tension of the spring when the cable moves back through the trolley but when the cable movement is reversed these portions will not pass the forked member but will push the bar forward in the housing, means in the housing operated by this forward movement of the bar to positively release said connection locking means.

15. In a glider launching apparatus, a ground post used for deflecting cables stretched out along the ground, consisting of a pair of T-sectioned bars adapted to be driven vertically into the ground with the sections corresponding to the top of the T adjacent each other, a head piece fastened to the top of the web of one bar and having a groove for the cable.

16. In a glider launching apparatus, a ground post used for deflecting cables stretched out along the ground, consisting of a pair of T-sectioned bars adapted to be driven vertically into the ground with the sections corresponding to the top of the T adjacent each other, a head piece fastened to the top of the web of one bar and having a groove for the cable, the other bar being longer than the first.

17. In a glider launching apparatus, a ground post used for deflecting cables stretched out along the ground, consisting of a pair of T-sectioned bars adapted to be driven vertically into the ground with the sections corresponding to the top of the T adjacent each other, a head piece fastened to the top of the web of one bar and having a groove for the cable, the said bar having the lower portion of its adjacent section widened for better anchorage.

18. In a glider launching apparatus, a ground post used for deflecting cables stretched out along the ground, consisting of a pair of T-sectioned bars adapted to be driven vertically into the ground with the sections corresponding to the top of the T adjacent each other, a head piece fastened to the top of the web of one bar and having a groove for the cable, the said bar having the lower portion of its adjacent section widened for better anchorage, said head piece having faired segmental surfaces above and below the groove to prevent fouling of the cable as it is swung out of the groove in the operation of the launching apparatus.

19. In a towed glider launching apparatus, a dual-sheave trolley, a pelican hook linked to said trolley, a lever pivotally mounted on the trolley having an opening that fits over the end of said hook when the latter is in closed position, resilient means fastened to said trolley to urge said lever into hook-engaging position, means operated in response to rotation of the sheaves in one direction to rock the lever against the pressure of said resilient means to release the hook.

CALVIN M. BOLSTER.